E. O. SESSIONS.
CABLE END BELL.
APPLICATION FILED OCT. 8, 1909.
1,057,178.
Patented Mar. 25, 1913.
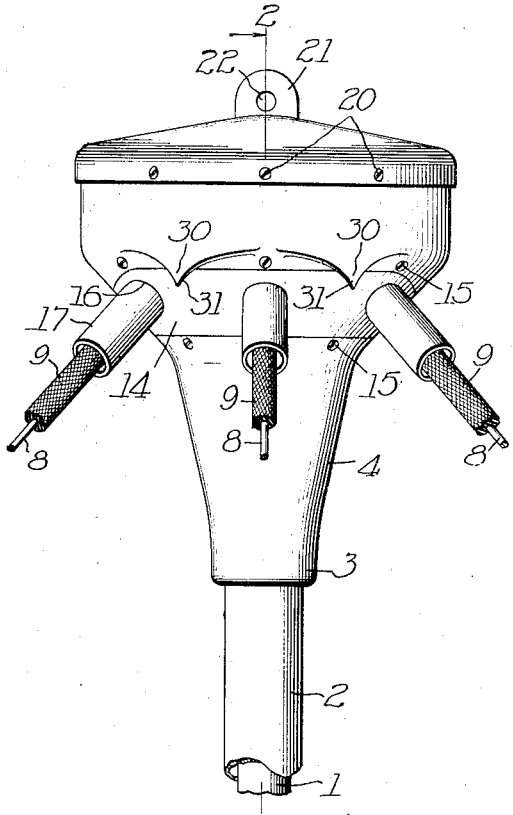
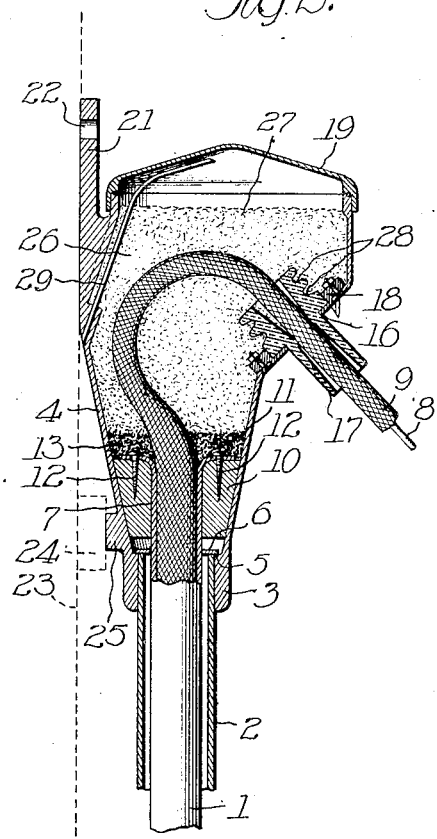
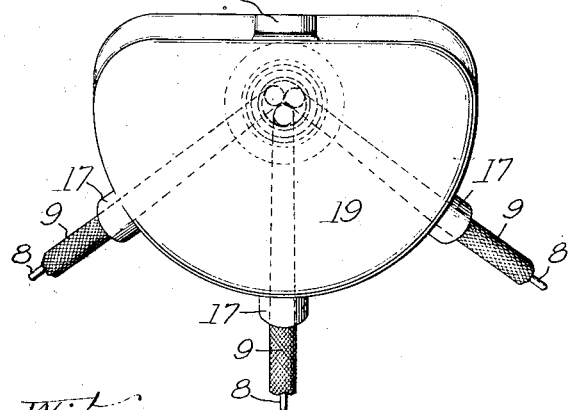
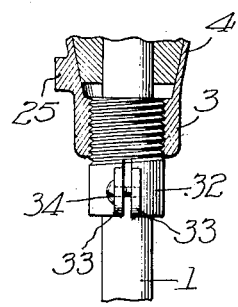
Witnesses:
Robert N Weir
Harold G Barritt
Inventor:
Edson O Sessions
By Brown Williams
Attorneys

UNITED STATES PATENT OFFICE.

EDSON O. SESSIONS, OF CHICAGO, ILLINOIS, ASSIGNOR OF ONE-HALF TO FAY WOODMANSEE, OF CHICAGO, ILLINOIS.

CABLE-END BELL.

1,057,178. Specification of Letters Patent. Patented Mar. 25, 1913.

Application filed October 8, 1909. Serial No. 521,764.

*To all whom it may concern:*

Be it known that I, EDSON O. SESSIONS, a citizen of the United States, residing at Chicago, in the county of Cook and State of Illinois, have invented a certain new and useful Improvement in Cable-End Bells, (Case 1,) of which the following is a full, clear, concise, and exact description, reference being had to the accompanying drawings, forming a part of this specification.

My invention relates to cable end bells which are otherwise often known as potheads, and has for its object the protection of insulated wire cables consisting of several conductors at or near the point where it is desired to make a joint in such cables.

In many case where lead covered underground cables are employed, it is desired to connect such cables with aerial lines. It is evident that unless some special form of joint were used, that moisture would get inside of the lead covering of the cable and the insulation resistance between the conductors forming the cable would be materially reduced, thereby causing a reduction in the insulation resistance with the liability of a short-circuit or burn out of the cables.

I am aware that various devices have been used to accomplish the object which I have in mind, but my invention embodies many improved features which have not been contained in previous devices. The lead covered cable is preferably inclosed in an iron or steel pipe as it passes from the ground to the cable end bell or pothead. After the lead has been removed from that portion of the cable where it is desired to separate the conductors, the exposed end of the lead covering and the separated conductors are embedded in an insulating compound which is contained within the casing of the cable end bell. The separate conductors then pass outwardly through suitable insulators and are then suitably joined to the corresponding conductors of an aerial line.

As stated above, it is of vital importance that no moisture should be present in the insulating material between the conductors of the cable, and in order to prevent, as much as possible, the access of moisture, the cable end bell is so constructed that in case of rain the water is kept from contact with the outgoing conductors to a great extent, this being accomplished by providing suitable projections from the casing, the water dripping downwardly from these projections between the conductors and not falling onto the same.

On account of its construction, my cable end bell is readily attached to a pole or other suitable support, from which it can be also readily removed, if desired.

My device is intended largely for use in connection with the transmission of high voltage currents and for this reason it is extremely important that the insulation provided in the cable end bell itself should be of the best possible kind. Since the casing of the cable end bell is constructed of iron or steel, eddy currents would normally be generated in the casing by induction. In order to reduce this effect as much as possible, I provide that the outgoing conductors pass through a plate of brass or other non-magnetic material. Suitable provision is also made so that the casing will be grounded and thereby prevent any danger in handling the same. These and other advantages of my invention will be more apparent by reference to the accompanying drawings, in which—

Figure 1 is a side elevation of my cable end bell, Fig. 2 is a vertical section on the line 2—2 of Fig. 1, Fig. 3 is a top plan view of the device, and Fig. 4 is a fragmentary side elevation and partly sectional view showing modified means of connecting the casing with the lead covering of the cable.

A lead covered cable 1 passes upwardly through an iron or steel pipe 2 over the end of which is shrunk or otherwise suitably connected the lower end 3 of the casing 4 of the cable end bell. The upper part of the inside of the lower end 3 of the casing 4 is provided with a shoulder 5 which is adapted to support a washer 6, the function of this washer being to hold the cable 1 in a central position in the upper part of the pipe 2. The cable 1 consists of a lead covering 7 within which is contained the conductors 8 which are covered with suitable insulation 9.

As shown in Figs. 1 and 2, the lower part of the cable end bell has sloping sides and toward the bottom of this casing a wedge shaped block 10 is inserted. After a suitable portion of the lead covering has been removed from the cable the upper end of the lead covering remaining is bent over as shown in the portion 11 and attached to the block 10 by means of screws or other suitable fastening devices 12. A layer of sealing compound 13 is inserted just above the bent over portion 11 of the lead covering of the cable and serves to prevent the access of moisture to the interior of the lead covered cable.

The casing 4 is provided with a plate 14 of brass or other non-magnetic material which is held in position by means of screws or bolts 15. The plate 14 is provided with openings 16 through which insulators 17 of porcelain, or other suitable material, pass. As most clearly shown in Fig. 2, the brass plate 14 is provided on its sides with inward annular projections 18 which serve to hold the insulators 17 in position. The screws 15 preferably pass into or through these annular projections.

The casing 4 is open at its top over which the cap 19 is adapted to fit, this cap being held in position by means of screws 20. The casing is also provided with an upward extension 21 in which is the opening 22 through which a lag screw is adapted to pass in order to fasten the cable end bell to a post or other suitable support one side of which may be represented by the dotted lines 23, shown in Fig. 2. A projection 24 projects from this post and the lug 25 also projects from the casing 4 of the cable end bell and is adapted to abut against the projection 24 on the post 23. It is thus evident that the cable end bell is supported by the lag screw which passes through the opening 22 in the projection 21 and that the device is retained in its position by means of having the lug 25 abut against the projection 24. In order to give the cable end bell further security in its adjusted position, the projection 24 may be provided with a depression into which the lug 25 passes and in this way lateral movement of the device about the lag screw passing through opening 22 as a pivot, is effectually prevented. By means of this construction it is evident that the location of the cable end bell may be changed by means of removing the lag screw from opening 22 thereby leaving the device free from attachment to the post 23.

After the end of the cable 1 has been inserted in the casing 4 of the cable end bell and the conductors with their insulation separated from each other and the portions 11 of the lead covering attached to the block 10 as explained above, the conductors are passed through the porcelain insulators 16, this operation being readily performed through the open end of the casing 4. The layer of sealing material 13 is now poured into the cavity for the purpose which has been explained above and allowed to set, after which the interior of the casing is filled with an insulating compound 26 approximately to the line 27. This insulating compound holds the conductors rigidly in position and also holds the insulators 17, which are preferably provided with grooves 28, in position. The cap 19 may be placed on the cable end bell as soon as the insulating compound has been poured in. A tube 29 connects the chamber formed between the top line 27 of the insulating compound 26 and the inside of the cap 19 with the atmosphere thereby keeping the pressure within this chamber the same as that of the atmosphere.

It is evident that with the above described construction there will be no access of moisture to the interior of the cable 1. I also prefer to have the insulators 17 slope in a downward direction in order to prevent moisture from passing even in through these insulators. I also provide downward projections 30 which are integral with the main casing 4 and terminate in points 31. It is evident that rain water falling on the cap 19 in traveling downward over the upper part of the casing 4, will pass to the points 31 from which it will drop between the insulators 17, thereby further preventing moisture from falling onto the insulation 9 of the conductors 8.

It is very desirable on account of the inductive action of the high voltage current adapted to be used with my form of cable end bell that the casing of the bell should be grounded, as explained above, and such grounding is performed through the lead covering of the cable which is in contact with the casing 4 through the washer 6 and the pipe 2 at the various points where the lead covering of the cable comes in contact with the inside of the pipe. The latter condition is not shown in the drawings. As also explained above, the brass plate 14 is used to hinder, as much as possible, the formation of eddy currents, but even with this plate it is desirable that the main casing should be grounded.

In case an iron or steel pipe is not used, the modification employed in Fig. 4 may be used in order to accomplish the grounding. The lower portion 3 of the casing 4 is threaded and into this threaded portion is screwed the grounding clamp 32. The lower part of this clamp is slotted and provided with outwardly extending portions 33 connected by a screw 34. After the clamp is screwed into position and the cable 1 is passed through the upper part of the clamp, it is evident a tight connection may be made by means of tightening the screw 34. In this way it is evident that a ground from the casing 4 is provided through the grounding clamp 32 and the lead covering 1 of the cable.

It is clear that many changes may be made in the detailed construction of my device without departing from the spirit of my invention.

What I claim as new and desire to cover by United States Letters Patent, is:

1. In a device of the class described, the combination of a casing adapted to receive the end of a cable having a plurality of conductors, sealing means within said casing for preventing access of moisture to the interior of said cable and to retain the conductors of said cable in predetermined positions, insulators passing through said casing, said insulators inclosing said conductors in their outward passage from said casing, and a plate of non-magnetic material mounted in said casing for holding said insulators.

2. In combination with a lead-covered cable having a plurality of conductors, a casing having the lower portion with inwardly sloping sides, a block fitting within the lower portion of said casing, means for attaching the lead covering of said cable to said block, insulating sealing means within said casing, said sealing means adapted to prevent the access of moisture to the interior of said cable, and means for grounding said casing through the lead covering of said cable.

3. In a cable end bell, a casing adapted to contain the end of a lead-covered cable, the lower part of said casing having inwardly sloping sides, a block fitting within the lower part of said casing, an opening in said block through which said cable passes, means for securing the turned-back edges of the lead covering of said cable to said block, means for holding said cable in a central position at its entrance to said casing, a layer of sealing material covering the turned-back edges of said lead covering, a mass of insulating material above said sealing layer, said insulating material adapted to hold the separated conductors of said cable in position, and an insulator associated with each conductor, said insulator being mounted in said casing and adapted to allow the passage of a conductor therethrough.

4. In a cable end bell, a casing adapted to contain the end of a lead-covered cable, the lower part of said casing having inwardly sloping sides, a block fitting within the lower part of said casing, an opening in said block through which said cable passes, means for securing the turned-back edges of the lead covering of said cable to said block, means for holding said cable in a central position at its entrance to said casing, a layer of sealing material covering the turned-back edges of said lead covering, a mass of insulating material above said sealing layer, said insulating material adapted to hold the separated conductors of said cable in position, a plate of non-magnetic material mounted in said casing, and a downwardly and outwardly sloping insulator associated with each conductor mounted in said plate, said insulator adapted to allow the passage of its associated conductor therethrough.

5. In a device of the class described, the combination of a downwardly tapering casing adapted to receive the end of a sheathed cable entering at the bottom and having a plurality of conductors, and a correspondingly tapered block jammed in the bottom of the casing through which block said cable may pass and to which the cable sheath is independently attached.

6. In a cable end bell, the combination of a casing having an opening at its lower end adapted to receive a depending cable, a metal conduit through which the cable passes to the casing, means for attaching the conduit to the casing, independent means the conduit to the casing, independent means within the casing for supporting the cable, the end of the sheath of the cable being flared out over the means for supporting the cable within the casing, and insulating and sealing material filling the space around and above the end of the sheath.

In witness whereof, I hereunto subscribe my name this 5th day of October, A. D. 1909.

EDSON O. SESSIONS.

Witnesses:
HARVEY L. HANSON,
HENRY M. HUXLY.